(12) United States Patent
Galusha et al.

(10) Patent No.: US 12,071,961 B1
(45) Date of Patent: Aug. 27, 2024

(54) WATER WELL SUBMERSIBLE PUMP FILTER

(71) Applicant: FES Labs, LLC, Seminole, TX (US)

(72) Inventors: Brandon Galusha, Andrews, TX (US); Jared Peterson, Belle Fourche, SD (US); Franz Friesen, Seminole, TX (US)

(73) Assignee: FES Labs, LLC, Seminole, TX (US)

( * ) Notice: Subject to any disclaimer, the term of this patent is extended or adjusted under 35 U.S.C. 154(b) by 0 days.

(21) Appl. No.: 18/498,789

(22) Filed: Oct. 31, 2023

(51) Int. Cl.
| | |
|---|---|
| *F04D 29/40* | (2006.01) |
| *B01D 35/26* | (2006.01) |
| *F04D 29/00* | (2006.01) |
| *F04D 29/02* | (2006.01) |
| *F04D 29/70* | (2006.01) |
| *B01D 35/02* | (2006.01) |
| *E21B 43/08* | (2006.01) |
| *F04D 13/08* | (2006.01) |

(52) U.S. Cl.
CPC .......... *F04D 29/708* (2013.01); *B01D 35/26* (2013.01); *F04D 29/007* (2013.01); *F04D 29/026* (2013.01); *F04D 29/406* (2013.01); *B01D 35/02* (2013.01); *B01D 2201/04* (2013.01); *B01D 2201/18* (2013.01); *E21B 43/086* (2013.01); *F04D 13/086* (2013.01)

(58) Field of Classification Search
None
See application file for complete search history.

(56) References Cited

U.S. PATENT DOCUMENTS

| | | | | |
|---|---|---|---|---|
| 5,038,853 | A * | 8/1991 | Callaway, Sr. | H02K 5/203 165/47 |
| 5,700,138 | A * | 12/1997 | Bevington | F04D 13/10 417/372 |
| 5,795,472 | A * | 8/1998 | Nurse, Jr. | B01D 29/035 210/357 |
| 8,011,032 | B2 * | 9/2011 | Cline | E04H 4/129 4/512 |
| 8,662,867 | B2 * | 3/2014 | Vedsted | F04D 29/708 417/423.3 |
| 9,027,763 | B2 * | 5/2015 | Kotesky | F04D 29/60 210/416.1 |
| 10,280,924 | B2 * | 5/2019 | Hökby | F04D 29/22 |
| 10,989,198 | B1 * | 4/2021 | Lin | F04D 13/086 |

(Continued)

*Primary Examiner* — Nathan C Zollinger
*Assistant Examiner* — Timothy P Solak
(74) *Attorney, Agent, or Firm* — Sheppard Mullin Richter & Hampton LLP

(57) ABSTRACT

An example water well submersible pump filter may comprise: (1) a perforated cap; (2) a perforated hollow cylindrical middle member joined to the perforated cap at a first end of the perforated hollow cylindrical middle member; and (3) a filter crown comprising: (a) a hollow cylindrical crown segment joined to the second end of the perforated hollow cylindrical middle member at a first end of the hollow cylindrical crown segment, (b) a hollow conical crown segment joined to a second end of the hollow cylindrical crown segment at a first end of the hollow conical crown segment, and (c) a ring of fins joined to, and extending longitudinally from, a second end of the hollow conical crown segment. The second end of the hollow conical crown segment may join to proximal ends of fins of the ring of fins.

15 Claims, 10 Drawing Sheets

(56) References Cited

U.S. PATENT DOCUMENTS

| | | | | |
|---|---|---|---|---|
| 2005/0263450 | A1* | 12/2005 | McGrew, Jr. .......... | B01D 35/26 |
| | | | | 210/416.1 |
| 2021/0340997 | A1* | 11/2021 | Wendland ............. | F04D 29/708 |
| 2022/0412376 | A1* | 12/2022 | Schraiber ............. | F04D 29/708 |

* cited by examiner

US 12,071,961 B1

WATER WELL SUBMERSIBLE PUMP FILTER

BACKGROUND

Water well submersible pumps are devices that push water from underground water sources like wells and reservoirs to the surface. As the name suggests, water well submersible pumps are typically submerged in underground water sources during operation, and intake/push water through a specially designed impeller. Motors for water well submersible pumps are also typically submerged in water during operation. Accordingly, many water well submersible pumps rely on impeller-generated water flow around their motors to cool the motors during operation.

Water well submersible pumps are common in the agricultural industry where they are used to bring water to the surface for irrigation and animal consumption. Water well submersible pumps can also be used in residential applications.

BRIEF DESCRIPTION OF THE DRAWINGS

The present disclosure, in accordance with one or more various examples, is described in detail with reference to the following figures. The figures are provided for purposes of illustration only and merely depict examples.

The figures are not exhaustive and do not limit the present disclosure to the precise form disclosed.

DETAILED DESCRIPTION

As alluded to above, water well submersible pumps are devices that push water to the surface from underground water sources like wells and reservoirs.

Figure 1:
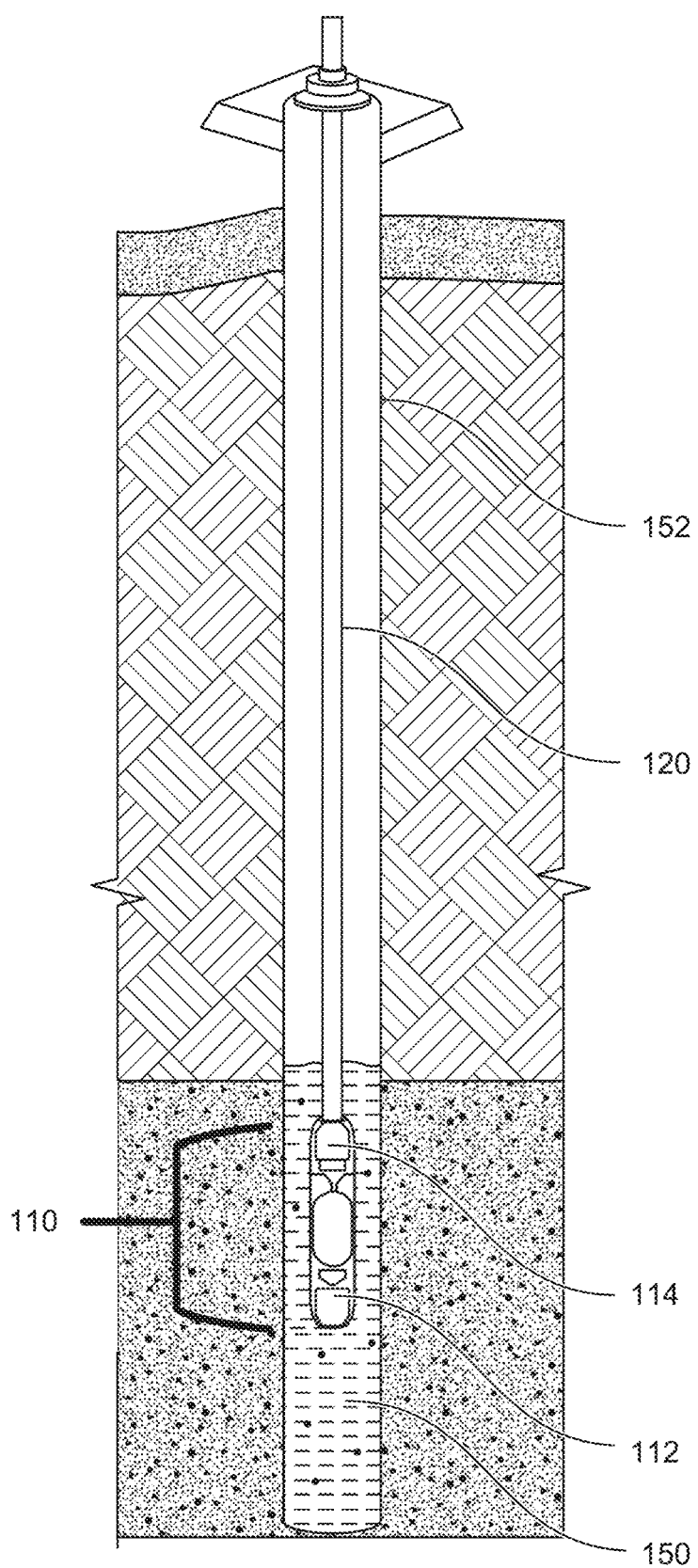
FIG. 1 illustrates an example water well submersible pump installation.

As depicted in the example illustration of FIG. 1, a typical water well submersible pump (e.g., water well submersible pump 110) comprises an approximately cylindrical shape. During operation, such a water well submersible pump is generally suspended in a vertical orientation within an underground water source (e.g., underground water source 150). A pipe (e.g., pipe 120) may fluidically connect the water well submersible pump to an above-ground receiver of pumped water. In many cases, the underground water source will be contained within a well casing (e.g., well casing 152). While in the specific example of FIG. 1 well casing 152 is depicted as an idealized/straight-edged cylinder, in many cases well casings can be more irregularly-shaped.

In its vertical orientation, a motor (e.g., motor 112) is typically located at the bottom of the water well submersible pump. Water inlet(s) and an impeller (e.g., impeller 114) are typically located higher up on the water well submersible pump. As alluded to above, many water well submersible pumps rely on impeller-generated water flow around their motors to cool the motors during operation. In general, higher horsepower (HP) water well submersible pumps (i.e., water well submersible pumps having higher HP motors) require greater motor cooling—and thus require greater water flow rate around their motors.

As depicted in FIG. 1, underground water sources (e.g., underground water source 120) in which water well submersible pumps are submerged often contain debris such as rocks, gravel, or other sediment. As examples of the presently disclosed technology are designed in appreciation of, when such debris is larger than approximately 2 millimeters (mm) in diameter, the debris can seriously degrade the impeller of a water well submersible pump during water intake. Impeller degradation can reduce the life expectancy of a water well submersible pump significantly—which can increase operational costs for farmers and residential users who rely on these devices for water.

However, effectively filtering debris from entering the impeller of a water well submersible pump—while reducing/minimizing negative impacts on pump operation—is a non-trivial technical challenge. For example (and as alluded to above), water well submersible pumps generally rely on impeller-generated water flow to cool their motors during operation. In other words, if water flow rate around a submerged motor is below a threshold level, the motor may not be sufficiently cooled during operation—thereby reducing life expectancy of the motor. As a result, even if a filter effectively prevents debris from entering an impeller of a water well submersible pump, if the filter fails to allow an sufficient/threshold water flow rate around a submerged motor during operation, overall life expectancy of the water well submersible pump may still degrade due to insufficient motor cooling. Relatedly, insufficient water flow rate through a filter can also negatively impact a water well submersible pump's ability to remove water from an underground water source. These water flow rate-related concerns present a technical challenge because tunable features of a filter that increase/improve water flow rate through the filter (e.g., larger holes, more holes per unit area, etc.) generally reduce debris filtration efficacy and/or structural integrity of the filter.

Against this backdrop, examples of the presently disclosed technology provide filters particularly structured and dimensioned to prevent harmful debris from reaching impellers of water well submersible pumps inserted into the filters—while: (a) allowing for sufficient water flow rates to cool motors of the water well submersible pumps; and (b) optimizing/improving structural integrity of the filters. As described in greater detail below, such filters also include unique/strategic design features which facilitate greater ease of use.

Figure 2A:
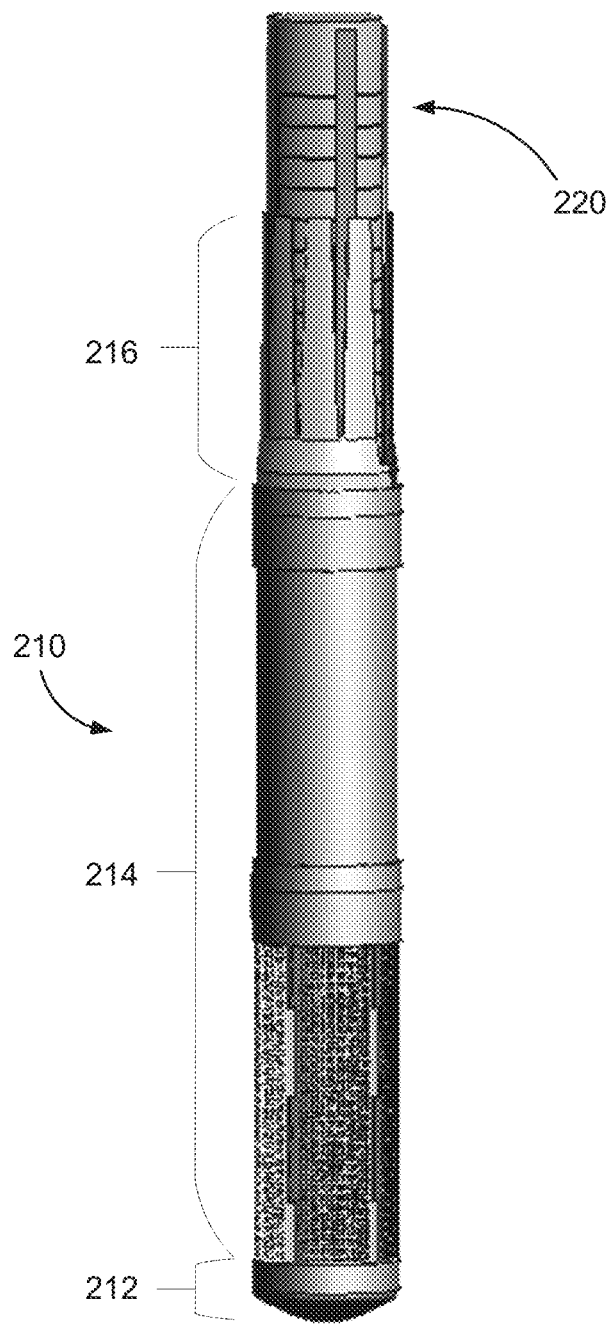
FIGS. 2A-2C depict perspective views of an example water well submersible pump filter, in accordance with various examples of the presently disclosed technology.
Figure 2B:
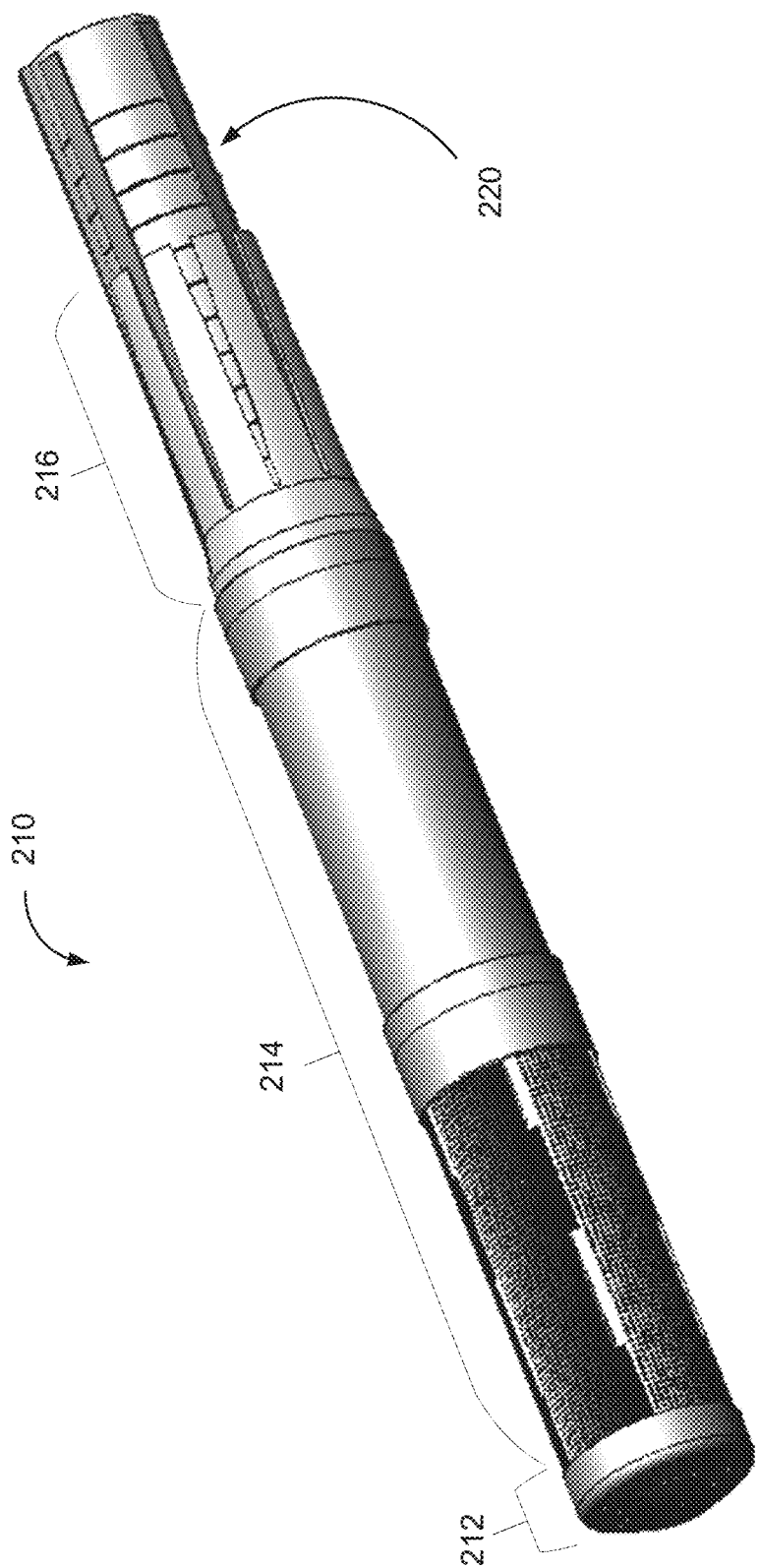
Figure 2C:
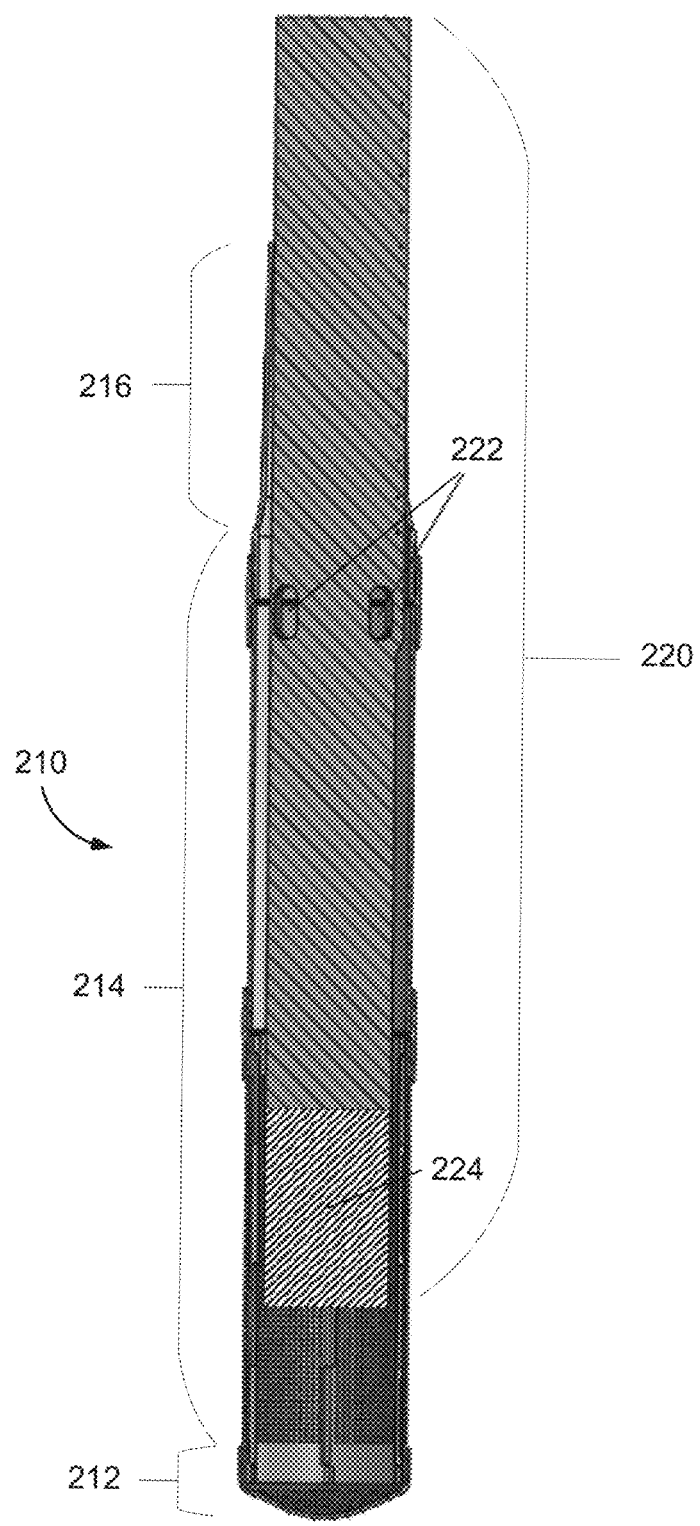

An example water well submersible pump filter of the presently disclosed technology is depicted in FIGS. 2A-2C. As depicted, water well submersible pump filter 210 may comprise: (a) a perforated cap 212; (b) a hollow cylindrical middle segment 214; and (c) a filter crown 216. Each of these components—along with advantages of their particularized design features (e.g., sizing and spacing between holes/perforations, dimensioning of hollow cylindrical middle segment 214 relative to a water well submersible pump inserted into water well submersible pump filter 210, particularized/strategic design features of perforated cap 212 and filter crown 216, etc.)— will be described in greater detail in conjunction with FIGS. 3A-3B, 4A-4B, and 5A-5B.

FIGS. 2A-2C also depict an example water well submersible pump 220 inserted within water well submersible pump filter 210. As depicted, water well submersible pump filter 210 can be shaped/dimensioned to accommodate a conventional, cylindrically-shaped water well submersible pump such as water well submersible pump 220. Relatedly, water well submersible pump filter 210 may be provided in various sizes to accommodate water well submersible pumps of different sizes (e.g., 4 inch pumps, 5 inch pumps, 6 inch pumps, 8 inch pumps, etc.).

Figure 5A:
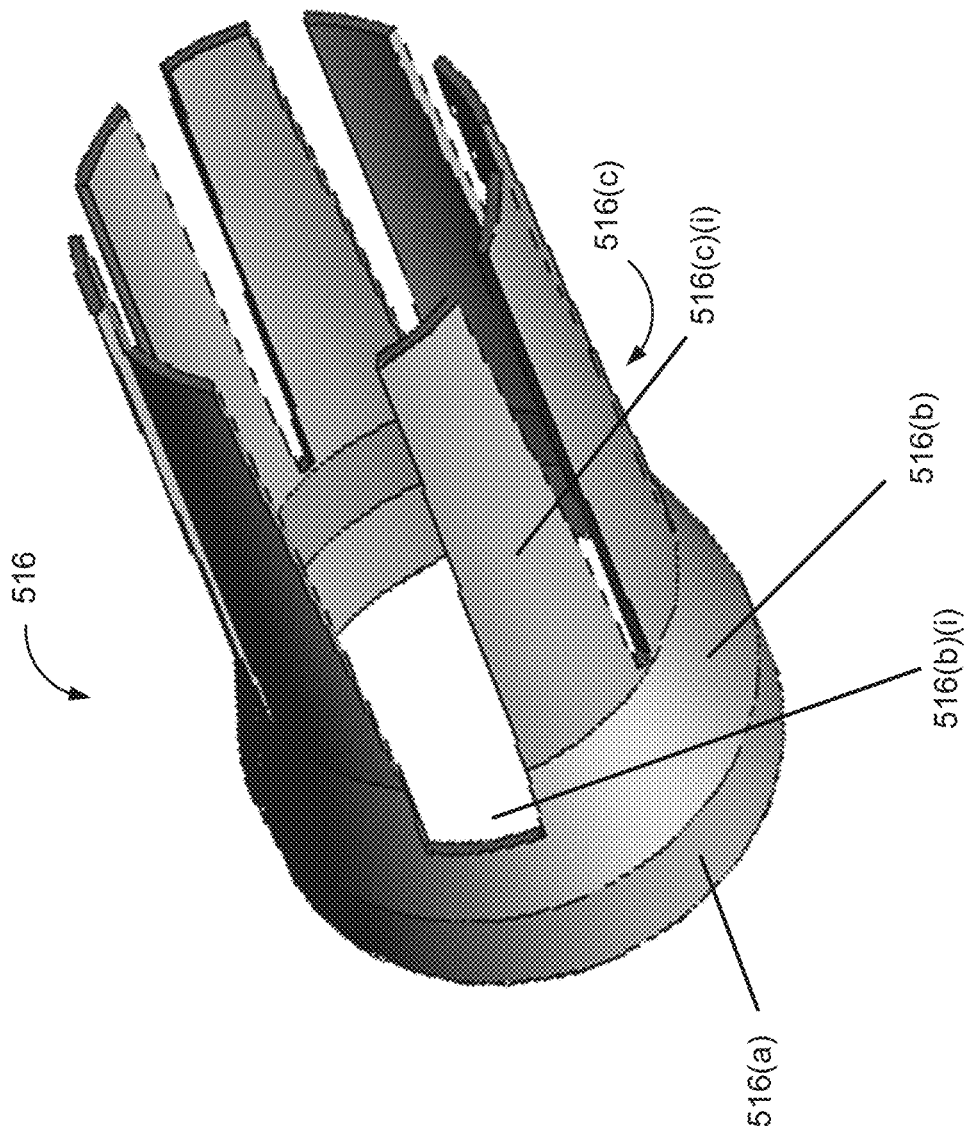
FIG. 5A depicts a perspective view of an example filter crown for a water well submersible pump filter, in accordance with various examples of the presently disclosed technology.
Figure 5B:
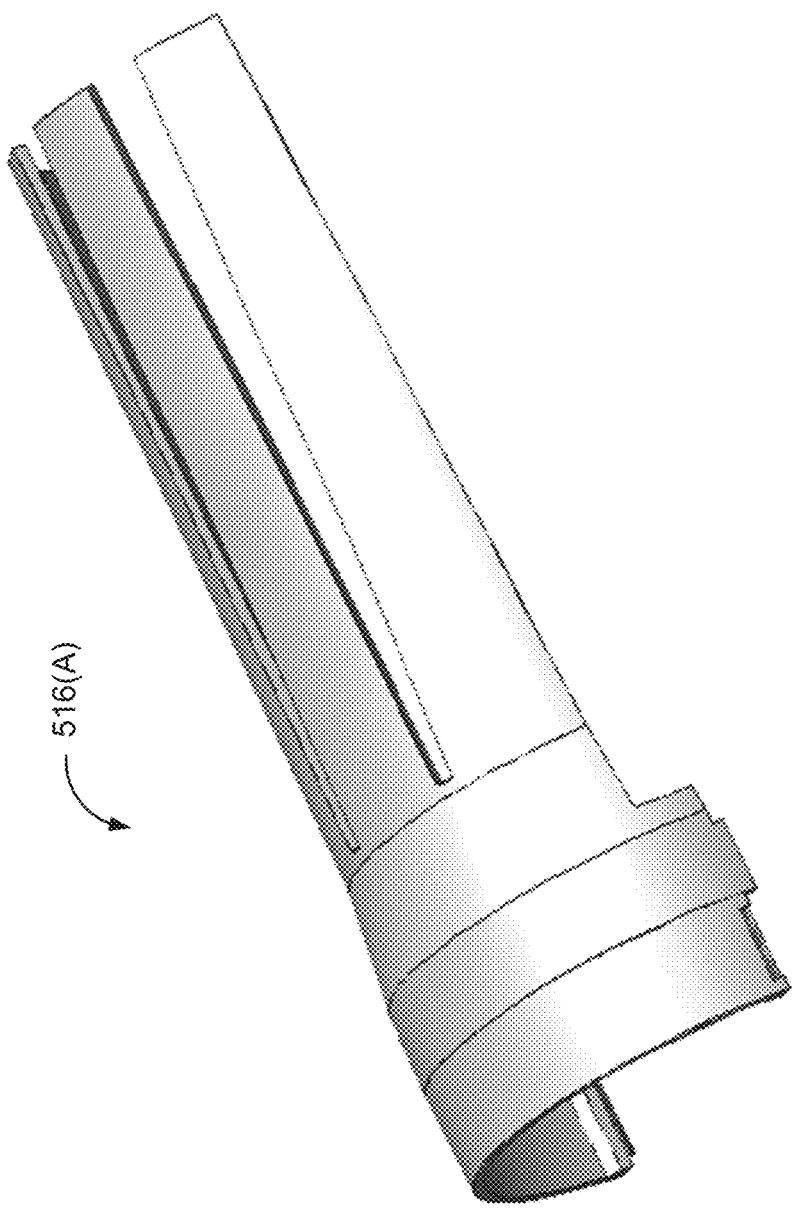
FIG. 5B depicts a perspective view of an example filter crown sub-section, in accordance with various examples of the presently disclosed technology.

As described in greater detail in conjunction with FIGS. 5A-5B, filter crown 216 comprises a ring of fins dimensioned/configured to compress/fold radially inwards around a top cylindrical segment of water well submersible pump 220. Once compressed/folded radially inwards, the fins may be secured to the top cylindrical segment of water well submersible pump 220 using various means, including water-resistant tape, mechanical couplings such as rings or bands, etc. With water well submersible pump filter 210 secured to water well submersible pump 220, the two devices may be easily lowered into an underground well or reservoir in tandem (as described in greater detail below, in certain examples perforated cap 212 may comprise a dome-shape that facilitates easier/smoother insertion of water well submersible pump filter 210 into irregularly-shaped well-casings). Relatedly, the specific structure of filter crown 216 (i.e., the ring of fins dimensioned/configured to compress/fold radially inwards around the top cylindrical segment of water well submersible pump 220) facilitates a user-friendly approach for securing and/or removing water well submersible pump filter 210 to/from water well submersible pump 220.

As best depicted in the cross-section perspective view of FIG. 2C, water well submersible pump 220 may comprise a motor 224 located at the bottom (or well floor-facing end) of water well submersible pump 220. As alluded to above, this is a conventional location for a motor of a water well submersible pump. As depicted in FIGS. 2A-2C, hollow cylindrical middle segment 214 may be dimensioned such that motor 224 is surrounded by a perforated segment of hollow cylindrical middle segment 214 when water well submersible pump 220 is inserted into water well submersible pump filter 210. This is another strategic design feature for water well submersible pump filter 210 that allows for improved/increased water flow around motor 224 during pump operation—thereby providing improved/sufficient motor cooling. By contrast, in certain implementations hollow cylindrical middle segment 214 may be dimensioned such that a non-perforated segment of hollow cylindrical middle segment 214 surrounds an upper portion of water well submersible pump 220 where water inlets (e.g., water inlets 222) and an impeller of water well submersible pump 220 are located. Here, the absence of perforations surrounding the water inlets/impeller can further reduce the likelihood of harmful debris entering the impeller. Relatedly, the absence of perforations for a segment of hollow cylindrical middle segment 214 can reduce manufacturing costs and improve the overall structural integrity of hollow cylindrical middle segment 214. Again, while water flow rate may decrease somewhat within the non-perforated segment of hollow cylindrical middle segment 214—such a reduction in water flow rate should not negatively impact motor cooling as the water flow rate around motor 224 should be relatively higher as motor 224 is surrounded by a perforated segment of hollow cylindrical middle segment 214 and perforated cap 212.

In various examples, water well submersible pump filter 210 (including its individual components) may comprise a synthetic polymer such as polyvinyl chloride (PVC), versions of acrylonitrile butadiene styrene (ABS), polypropylene, etc. As described below, each of perforated cap 212, hollow cylindrical middle segment 214, and filter crown 216 may comprise one or more separate injection-molded components that are assembled/joined together. For example, when water well submersible pump filter 210 (including its individual components) comprises PVC, PVC glue may be used to join/assemble separate injection-molded components. Here, the selection of PVC (or related materials) may be well-suited for the agricultural industry where PVC is commonly used and recognized.

Figure 3A:
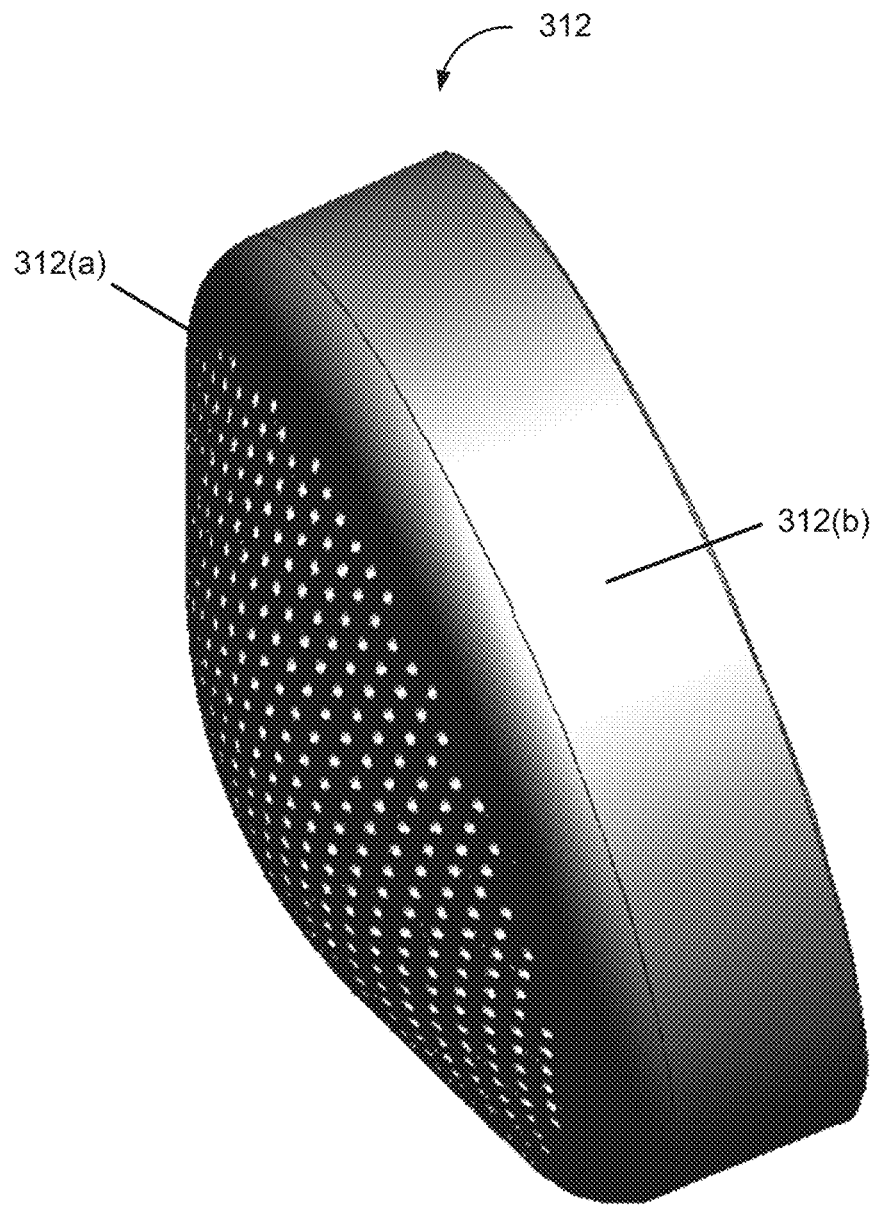
FIGS. 3A-3B depict perspective views of an example perforated cap for a water well submersible pump filter, in accordance with various examples of the presently disclosed technology.
Figure 3B:
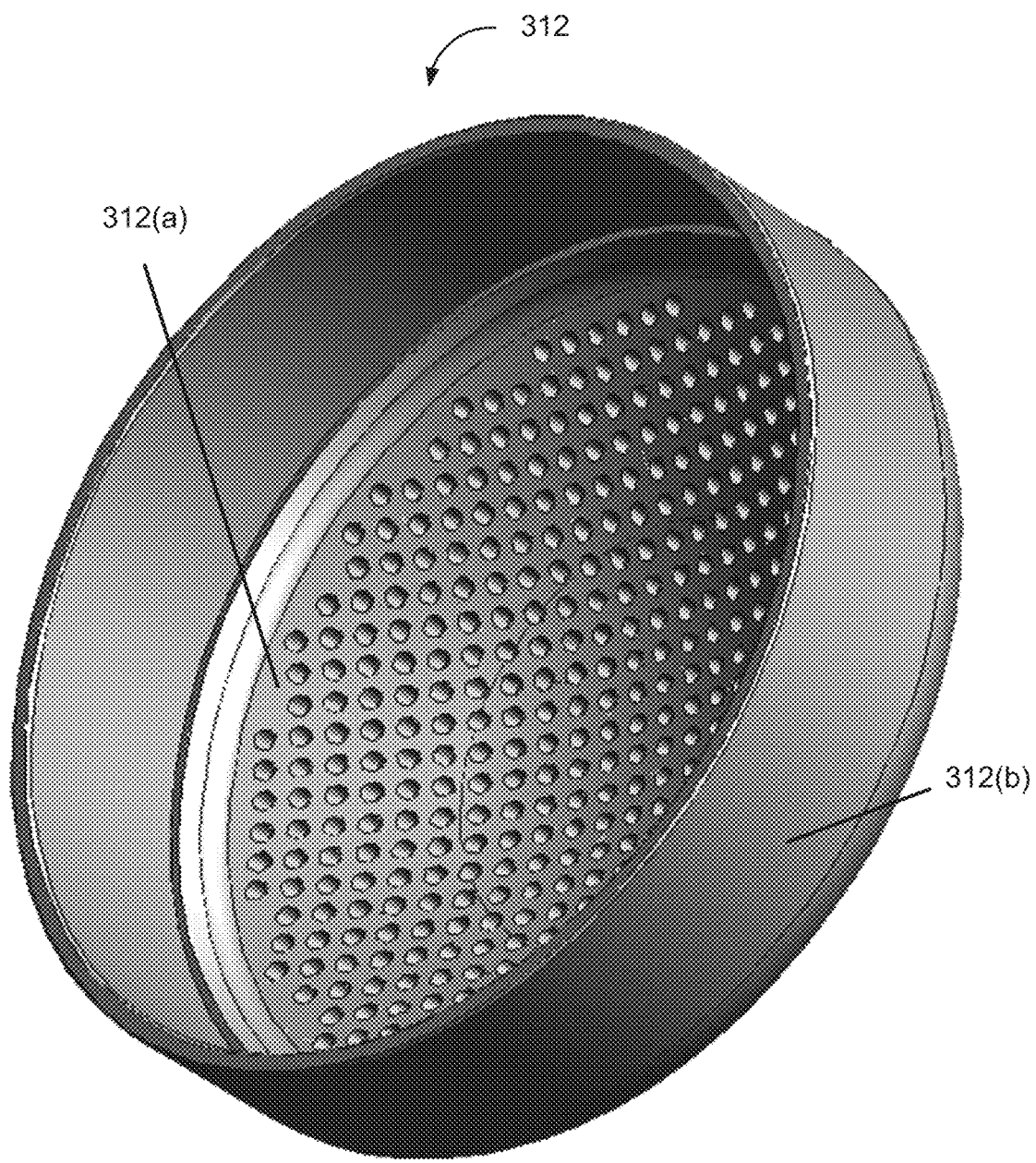

FIGS. 3A-3B depict perspective views of an example perforated cap 312 for a water well submersible pump filter, in accordance with various examples of the presently disclosed technology. Here, perforated cap 312 may comprise the same/similar structure as perforated cap 212 of FIGS. 2A-2C.

As depicted, perforated cap 312 may comprise a perforated dome-shaped segment 312(a) and a non-perforated hollow cylindrical segment 312(b). In certain examples, perforated cap 312 may be injection molded as a single piece. However in other examples, perforated dome-shaped segment 312(a) and non-perforated hollow cylindrical segment 312(b) may be injection molded separately and joined to together (e.g., using PVC glue).

As alluded to above, the dome shape for perforated dome-shaped segment 312(a) can facilitate easier/smoother insertion when an associated water well submersible filter is lowered into an irregularly-shaped well casing. In other words, an alternative design that included a flat-cap instead of a dome-shaped cap may be more likely to catch/snag on the irregularities of a well-casing as an associated water well submersible filter is lowered into the irregularly-shaped well casing.

Relatedly, the holes of perforated dome-shaped segment 312(a) can allow for increased/improved water flow rate around a motor of a water well submersible pump, which will typically be located above (and relatively proximate to) perforated dome-shaped segment 312(a) (see e.g., FIG. 2C). The increased/improved water flow rate allowed by holes of perforated dome-shaped segment 312(a) can be especially important for cooling higher HP motors. In other words, an alternative design featuring a non-perforated cap may not allow for sufficient water flow to cool these higher HP motors during operation—leading to reduced life expectancy for the motors.

As alluded to above, the sizing of, and spacing between, holes of perforated dome-shaped segment 312(a) may also be optimized to balance water flow rate allowance against: (a) debris filtration efficacy; (b) structural integrity considerations; and (c) manufacturing cost reductions. For instance, example tests conducted in accordance with the presently disclosed technology have found that debris having a diameter exceeding roughly 2 mm can increase impeller degradation significantly, while debris having a diameter smaller than 2 mm is significantly less likely to cause impeller degradation. While in theory any hole diameter smaller than 2 mm should filter out the especially harmful debris, smaller hole diameter can also have a negative impact on water flow rate. Relatedly, while a greater number of holes per unit area could increase water flow rate when smaller diameter holes are used, a greater number of holes per unit area can reduce structural integrity and increase manufacturing costs.

Taking all of these factors into consideration, example tests were conducted in accordance with the presently disclosed technology to determine optimal hole size and spacing for perforated components (e.g., perforated caps and perforated segments of the hollow cylindrical middle members) of water well submersible pump filters of the presently disclosed technology. In accordance with this testing, certain implementations utilize a hole size of between 1.5 mm and 2.5 mm, and a spacing of between 3 and 4 mm along a diagonal between respective holes. However, it should be understood that in other implementations different hole diameters and spacing may be used. Relatedly, in various implementations perforated cap 312 may comprise a flat (i.e., non-dome-shaped) cap, and/or be non-perforated.

Figure 4A:
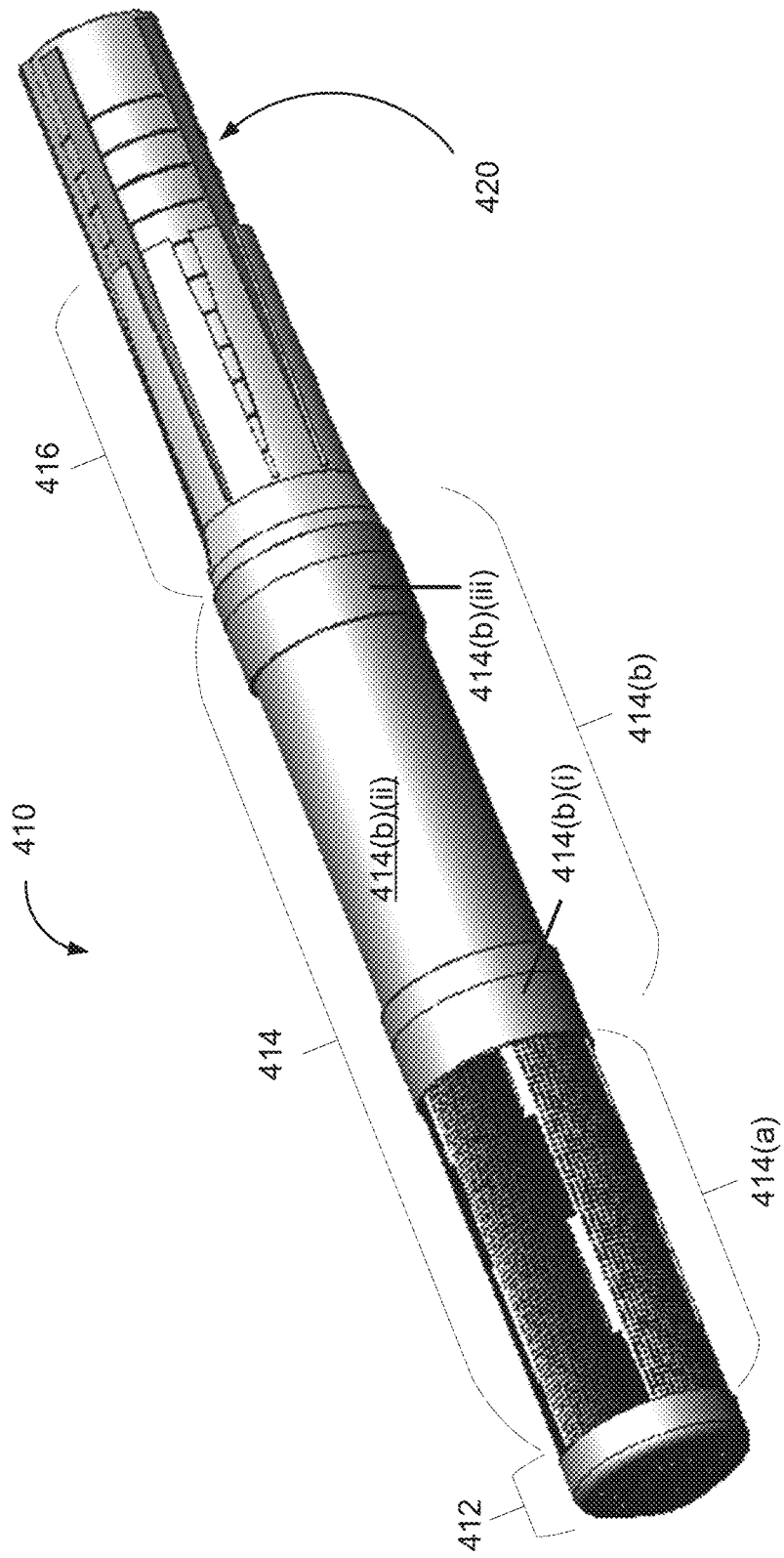
FIG. 4A depicts a perspective view of an example water well submersible pump filter including a hollow cylindrical middle segment, in accordance with various examples of the presently disclosed technology.

FIG. 4A depicts a perspective view of an example water well submersible pump filter 410 including a hollow cylindrical middle segment 414, in accordance with various examples of the presently disclosed technology. As depicted, water well submersible pump filter 410 may comprise the same/similar construction as water well submersible pump filter 210 of FIGS. 2A-2C.

As depicted, hollow cylindrical middle segment 414 may comprise a perforated hollow cylindrical segment 414(*a*) and a non-perforated hollow cylindrical segment 414(*b*). In various examples, perforated hollow cylindrical segment 414(*a*) and non-perforated hollow cylindrical segment 414(*b*) may be injection molded separately and joined together (e.g., using PVC glue). The bottom end (i.e., the well floor-facing end) of perforated hollow cylindrical segment 414(*a*) may be joined to a top, circular end of perforated cap 412 in the same/similar manner. Likewise, a top end of non-perforated hollow cylindrical segment 414(*b*) can be joined to a bottom end of filter crown 416 in the same/similar manner. While not depicted in the specific examples of FIGS. 4A and 2A-2C, in various examples perforated hollow cylindrical segment 414(*a*) may comprise multiple sub-segments joined by a coupler (e.g., a coupler that: (1) joins to a top end of a bottom sub-segment of perforated hollow cylindrical segment 414(*a*) at a bottom end of the coupler; and (2) joins to a bottom end of a top sub-segment of perforated hollow cylindrical segment 414(*a*) at a top end of the coupler).

As depicted, in certain examples non-perforated hollow cylindrical segment 414(*b*) may comprise: (i) a hollow cylindrical coupler 414(*b*)(*i*) that couples the top end of perforated hollow cylindrical segment 414(*a*) to a bottom end of a non-perforated hollow cylindrical sub-segment 414(*b*)(*ii*); (ii) non-perforated hollow cylindrical sub-segment 414(*b*)(*ii*); and (iii) a hollow cylindrical coupler 414(*b*)(*iii*) that couples a top end of non-perforated hollow cylindrical sub-segment 414(*b*)(*ii*) to a bottom end of filter crown 416. In these examples, hollow cylindrical coupler 414(*b*)(*i*), non-perforated hollow cylindrical sub-segment 414(*b*)(*ii*), and hollow cylindrical coupler 414(*b*)(*iii*) may be injection molded separately and joined together (e.g., using PVC glue).

As alluded to above, hollow cylindrical middle segment 414 may be dimensioned such that a motor of water well submersible pump 420 is surrounded by perforated hollow cylindrical segment 414(*a*) when water well submersible pump 420 is inserted into water well submersible pump filter 410. This is another strategic design feature for water well submersible pump filter 410 that allows for improved/increased water flow around the motor during pump operation—thereby providing improved/sufficient motor cooling. By contrast, in certain implementations hollow cylindrical middle segment 414 may be dimensioned such that non-perforated hollow cylindrical segment 414(*b*) surrounds an upper portion of water well submersible pump 420 where water inlets and an impeller of water well submersible pump 420 are located. Here, the absence of perforations surrounding the water inlets/impeller can further reduce the likelihood of harmful debris entering the impeller. Relatedly, the absence of perforations for non-perforated hollow cylindrical segment 414(*b*) can reduce manufacturing costs, and improve overall structural integrity for hollow cylindrical middle segment 414. Again, while water flow rate may decrease somewhat within non-perforated hollow cylindrical segment 414(*b*)—such a reduction in water flow rate should not negatively impact motor cooling as the water flow rate around the motor should be relatively higher as the motor is surrounded by perforated hollow cylindrical segment 414(*a*).

Other parameters of hollow cylindrical middle segment 414 may also be optimized for improved/increased water flow rate into, and within, water well submersible pump filter 410. For example (and as alluded to above), the sizing of, and spacing between, holes of perforated hollow cylindrical segment 414(*a*) may also be optimized to balance water flow rate allowance against: (a) debris filtration efficacy; (b) structural integrity considerations; and (c) manufacturing cost reductions. As described above, informed by tests performed in accordance with the presently disclosed technology, certain implementations utilize a hole size of between 1.5 mm and 2.5 mm, and a spacing of between 3 and 4 mm along a diagonal between respective holes (it should be understood that other implementations may utilize hole sizing and spacing outside these ranges, such as to accommodate water well submersible pumps of different sizes and HPs). As another example, hollow cylindrical middle segment 414 may be specially dimensioned to allow a radial clearance of between 3 millimeters (mm) and 13 mm between the outer circumferences of water well submersible pump 420 and the inner circumference of hollow cylindrical middle segment 414. Here, a smaller radial clearance may restrict/reduce water flow rate within water well submersible pump filter 410. By contrast, a larger radial clearance could add to material cost and overall bulk—which could make insertion into narrow well casings more difficult. Here it should be understood that optimal radial clearance between water well submersible pump filter and water well submersible pump may vary based on water well submersible pump size and HP. Accordingly, in various implementations radial clearance between water well submersible pump filter 410 and water well submersible pump 420 may be less than 3 mm, or greater than 13 mm.

In certain implementations, perforated hollow cylindrical segment 414(*a*) may comprise multiple sub-sections that are joined together (e.g., via PVC glue).

Figure 4B:
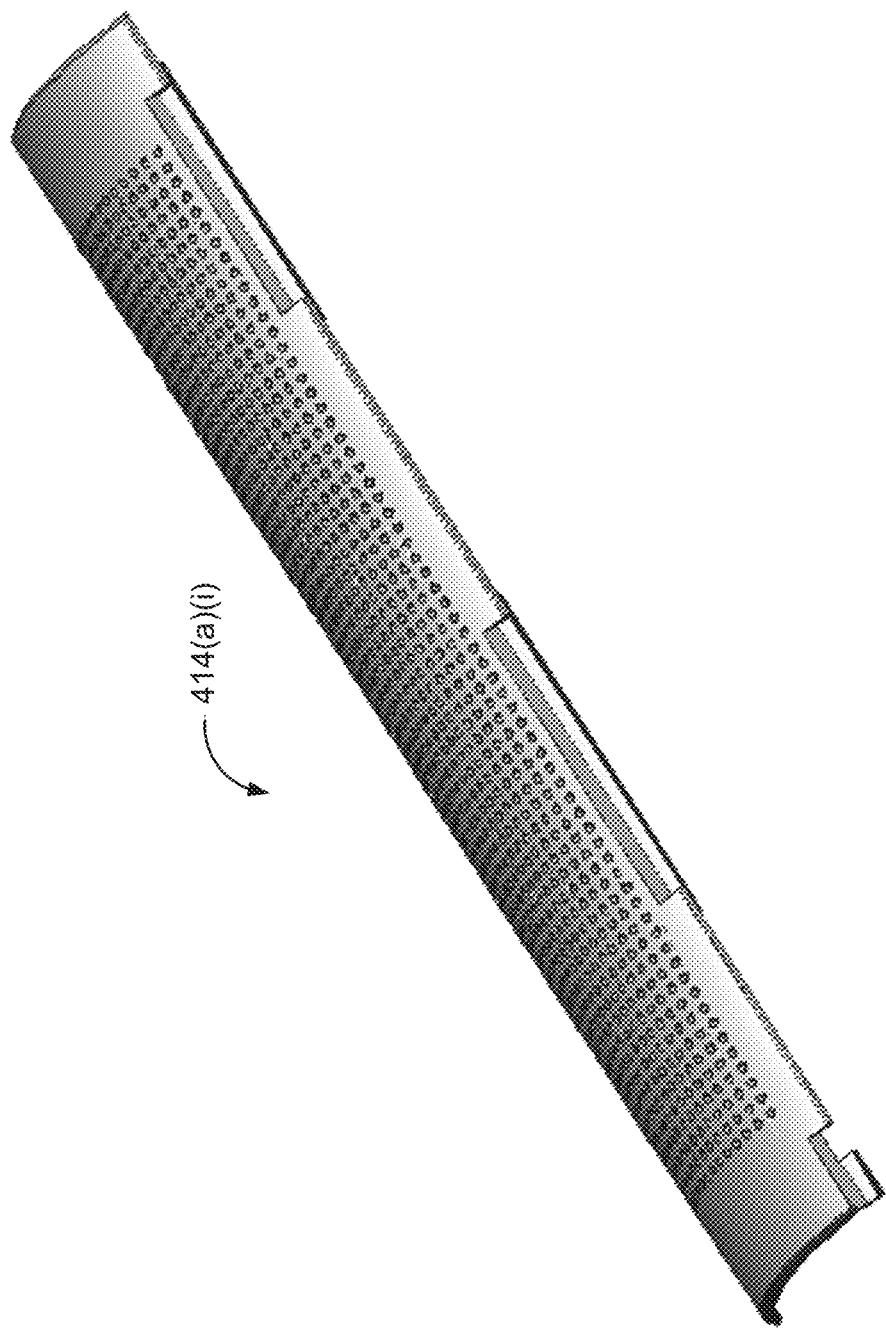
FIG. 4B depicts a perspective view of an example perforated sub-section of the hollow cylindrical middle segment of FIG. 4A, in accordance with various examples of the presently disclosed technology.

FIG. 4B depicts a perspective view of an example perforated sub-section 414*a*)(*i*) of perforated hollow cylindrical segment 414(*a*). As depicted, perforated sub-section 414*a*)(*i*) may span perforated hollow cylindrical segment 414(*a*) lengthwise. In various examples, perforated hollow cylindrical segment 414(*a*) may comprise between 3-8 perforated sub-sections of the same/similar construction as perforated sub-section 414*a*)(*i*). Each perforated sub-section may be injection molded separately and joined to other perforated sub-sections (e.g., via PVC glue). Such construction/assembly may improve structural integrity of perforated hollow cylindrical segment 414(a), and/or reduce manufacturing costs.

FIG. 5A depicts a perspective view of an example filter crown 516 for a water well submersible pump filter, in accordance with various examples of the presently disclosed technology.

As depicted, filter crown 516 may comprise: (a) a hollow cylindrical crown segment 516(a); (b) a hollow conical crown segment 516(b) joined to hollow cylindrical crown segment 516(a) at a first end of hollow conical crown segment 516(b); and (c) a ring of fins 516(c) extending longitudinally from a second end of hollow conical crown segment 516(b).

In various implementations, filter crown 516 may be injection molded as a single piece, whereas in other examples individual structural components of filter crown 516 may be injection molded separately and joined together (e.g., using PVC glue).

As depicted in FIGS. 2A-2C and 4A, a bottom end of hollow cylindrical crown segment 516(a) may join to a hollow cylindrical middle segment of the water well submersible pump filter. A top end of hollow cylindrical crown segment 516(a) may join to a bottom end of hollow conical crown segment 516(b). Likewise, a top end of hollow conical crown segment 516(b) may join to proximal end of fins of the ring of fins. The diameter of the bottom end of hollow conical crown segment 516(b) may be larger than the top end of hollow conical crown segment 516(b). This reduction in diameter can facilitate more snug securing of filter crown 516 (including the ring of fins 516(c)) around a top cylindrical segment of a water well submersible pump inserted within the water well submersible pump filter. As depicted in FIG. 5A, in certain implementations hollow conical crown segment 516(b) may include a notch 516(b)(i) extending from the top end of hollow conical crown segment 516(b) towards the bottom end of hollow conical crown segment 516(b). Notch 516(b)(i) may be dimensioned to accommodate a wiring trunk of a water well submersible pump inserted into the water well submersible pump filter. As depicted, there may be no fin above notch 516(b)(i) in order to further accommodate the wiring trunk.

As depicted, the fins of ring of fins 516(c) may extend longitudinally from the second end of hollow conical crown segment 516(b). In other words, the fins of the ring of fins may extend approximately parallel to a shared axis of hollow cylindrical crown segment 516(a) and hollow conical crown segment 516(b). As depicted in FIGS. 2A-2C and FIG. 4A, the shared axis of hollow cylindrical crown segment 516(a) and hollow conical crown segment 516(b) may also be shared with a hollow cylindrical middle segment (e.g., hollow cylindrical middle segments 214 or 414) to which filter crown 516 is joined.

As alluded to above, ring of fins 516(c) may be dimensioned and shaped to compress/fold radially inwards around a top cylindrical segment of water well submersible pump inserted within the water well submersible pump filter. For example, fin 516c)(i) tapers from a proximal end of fin 516c)(i) to a distal end of fin 516c)(i). The other fins of ring of fins 516(c) taper in a similar manner. Accordingly, there may be triangular-shaped slits between the fins before. These slits may reduce/minimize as the fins are compressed radially inwards around a top cylindrical segment of water well submersible pump inserted within the water well submersible pump filter. Once compressed radially inwards, the fins may be secured to the top cylindrical segment of water well submersible pump using various means, including water-resistant tape, mechanical couplings such as rings or bands, etc. With the water well submersible pump filter secured to the water well submersible pump, the two devices may be easily lowered into an underground well or reservoir in tandem. Relatedly, the specific structure of filter crown 516 (i.e., the ring of tapered fins dimensioned/shaped to compress radially inwards around the top cylindrical segment of a water well submersible pump) facilitates a user-friendly approach for securing and/or removing the water well submersible pump filter to/from a water well submersible pump.

In certain examples, filter crown 516 may comprise two (half) sub-sections separately injection molded and then joined together (e.g., PVC glue). FIG. 5B depicts a perspective view of an example filter crown sub-section 516(A) for filter crown 516 of FIG. 5A. As depicted, filter crown sub-section 516(A) may comprise a half-section that spans filter crown 516 lengthwise. Filter crown sub-section 516(A) can be joined to a corresponding (half) filter crown sub-section to form filter crown 516. Such a methodology for forming filter crown 516 may improve structural integrity for filter crown 516 and/or reduce manufacturing costs. In various implementations, filter crown 516 may comprise more than two sub-sections which are separately injection molded and then joined together (e.g., PVC glue).

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A water well submersible pump filter comprising:
a perforated cap;
a hollow cylindrical middle member joined to the perforated cap at a first end of the hollow cylindrical middle member, wherein the hollow cylindrical middle member comprises a perforated hollow cylindrical segment proximate to the first end of the hollow cylindrical middle member; and
a filter crown comprising:
a hollow cylindrical crown segment joined to a second end of the hollow cylindrical middle member at a first end of the hollow cylindrical crown segment,
a hollow conical crown segment joined to a second end of the hollow cylindrical crown segment at a first end of the hollow conical crown segment, and a ring of fins joined to, and extending longitudinally from, a second end of the hollow conical crown segment, wherein the second end of the hollow conical crown segment joins to proximal ends of fins of the ring of fins.

2. The water well submersible pump filter of claim 1, wherein the perforated cap comprises a dome-shape.

3. The water well submersible pump filter of claim 1, wherein:

the hollow conical crown segment includes a notch extending from the second end of the hollow conical crown segment towards the first end of the hollow conical crown segment; and the notch is dimensioned to accommodate a wiring trunk of a water well submersible pump inserted into the water well submersible pump filter.

4. The water well submersible pump filter of claim 1, wherein a respective fin of the ring of fins tapers from a proximal end of the respective fin to a distal end of the respective fin.

5. The water well submersible pump filter of claim 1, wherein the ring of fins is dimensioned to compress radially inwards around a cylindrical segment of a water well submersible pump inserted into the water well submersible pump filter.

6. The water well submersible pump filter of claim 1, wherein:

a diameter of the hollow cylindrical middle member is dimensioned to surround a water well submersible pump centrally inserted into the water well submersible pump filter with a radial clearance of between 3 millimeters (mm) and 13 mm.

7. The water well submersible pump filter of claim 1, wherein:

the hollow cylindrical middle member further comprises a non-perforated hollow cylindrical segment;

a first end of the perforated hollow cylindrical segment joins to a circular end of the perforated cap;

a second end of the perforated hollow cylindrical segment joins to a first end of the non-perforated hollow cylindrical segment; and a second end of the non-perforated hollow cylindrical segment joins to the filter crown.

8. The water well submersible pump filter of claim 7, wherein lengths of the perforated hollow cylindrical segment and the non-perforated hollow cylindrical segment are dimensioned such that the perforated hollow cylindrical segment surrounds a motor of a water well submersible pump inserted into the water well submersible pump filter.

9. The water well submersible pump filter of claim 1, wherein:

the perforated hollow cylindrical segment comprises a plurality of perforated sub-sections joined together; and each perforated sub-section spans the perforated hollow cylindrical segment lengthwise.

10. The water well submersible pump filter of claim 1, wherein holes of the perforated cap and the perforated hollow cylindrical segment are between 1.5 mm and 2.5 mm in diameter.

11. The water well submersible pump filter of claim 1, wherein holes of the perforated cap and the perforated hollow cylindrical segment are spaced between 3 mm and 4 mm apart along a diagonal between respective holes.

12. The water well submersible pump filter of claim 1, wherein the perforated cap, the hollow cylindrical middle member, and the filter crown comprise a synthetic polymer plastic.

13. The water well submersible pump filter of claim 12, wherein the synthetic polymer plastic comprises polyvinyl chloride (PVC).

14. The water well submersible pump filter of claim 13, wherein the perforated cap, the hollow cylindrical middle member, and the filter crown are joined together via PVC glue.

15. A water well submersible pump filter comprising:

a dome-shaped perforated cap;

a hollow cylindrical middle member joined to a circular end of the dome-shaped perforated cap at a first end of the hollow cylindrical middle member, wherein the hollow cylindrical middle member comprises a perforated hollow cylindrical segment; and a filter crown comprising:

a hollow cylindrical crown segment joined to a second end of the hollow cylindrical middle member at a first end of the hollow cylindrical crown segment, a hollow conical crown segment joined to a second end of the hollow cylindrical crown segment at a first end of the hollow conical crown segment, wherein diameter of the first end of the hollow conical crown segment is larger than diameter of a second end of the hollow conical crown segment, and a ring of fins joined to, and extending longitudinally from, the second end of the hollow conical crown segment, wherein the second end of the hollow conical crown segment joins with proximal ends of fins of the ring of fins.

* * * * *